US008289530B2

(12) United States Patent
GuilleminFranco et al.

(10) Patent No.: US 8,289,530 B2
(45) Date of Patent: Oct. 16, 2012

(54) IMAGE FORMING DEVICE WITH REPLACEABLE PAPER HANDLING ACCESSORY

(75) Inventors: Gustavo Miguel GuilleminFranco, Jalisco (MX); Joel Tague, Nampa, ID (US); John Huffman, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3424 days.

(21) Appl. No.: 10/229,987

(22) Filed: Aug. 28, 2002

(65) Prior Publication Data

US 2004/0042026 A1 Mar. 4, 2004

(51) Int. Cl.
*G06K 15/00* (2006.01)

(52) U.S. Cl. ..................... 358/1.12; 358/1.13; 358/1.15; 347/153; 347/154; 347/155; 347/157; 399/407; 399/408

(58) Field of Classification Search .................. 347/153, 347/154, 155, 157; 358/1.15, 1.12, 1.13; 271/296; 399/108, 110, 111, 113, 121, 122, 399/124, 407, 408
See application file for complete search history.

(56) References Cited

U.S. PATENT DOCUMENTS

| | | | | |
|---|---|---|---|---|
| 5,008,709 A | 4/1991 | Shinada et al. | | |
| 5,119,206 A * | 6/1992 | Rourke et al. | ................ | 358/296 |
| 5,390,910 A * | 2/1995 | Mandel et al. | ................ | 271/296 |
| 5,392,092 A | 2/1995 | Laidlaw et al. | | |
| 5,449,157 A | 9/1995 | Kawano et al. | | |
| 5,749,024 A | 5/1998 | Young | | |
| 5,782,467 A | 7/1998 | Johnson | | |
| 5,905,520 A * | 5/1999 | Fujii et al. | ..................... | 347/153 |
| 6,185,010 B1 | 2/2001 | Watanabe | | |
| 6,381,443 B1 | 4/2002 | Kawata et al. | | |
| 2002/0047042 A1* | 4/2002 | Salgado | ........................ | 235/378 |

* cited by examiner

*Primary Examiner* — David K Moore
*Assistant Examiner* — Vu Hang

(57) ABSTRACT

An image forming apparatus for printing on at least one page of a print media is disclosed. The apparatus includes a removable media handling device that directs the printed media to a first location or a second location, the second location functions as a finishing stage to perform a finishing step on the print media. The removable media handling device includes a media diverter to direct the media to either the first or second location. The image forming apparatus also includes a housing, a print engine to fix an image representing data to the page of print media, a formatter to supply data to the print engine, the formatter being configured to supply a first set of data representing the side of the page to be printed and a second set of data to provide instructions on the output of the printed page, and print media supplier to supply pages of print media to the print engine from a stack of print media pages having leading edges.

19 Claims, 2 Drawing Sheets

IMAGE FORMING DEVICE WITH REPLACEABLE PAPER HANDLING ACCESSORY

BACKGROUND OF THE INVENTION

Field of the Invention

The present invention relates generally to image forming devices and, more specifically, the present invention relates to providing interchangeable paper handling accessories with paper diverting means.

Image forming devices, such as printers, have a need for different paper paths. For example, often the printed paper media is delivered into a holding bin generally on top of the printer. Additionally, the user may desire to perform some finishing function on the printed media, such as stapling a stack of sheets together, punching holes within the stack, or even providing a binding so the sheets are held together along a spine. Further, the paper handling accessory may also be able to add extra output capacity.

In order to direct the media to the right output destination, the printer typically has an electromechanical system composed of a diverter that is activated by a solenoid. The solenoid is then managed by the printer controller so as to divert the media to the desired operation or finish destination.

In many printers, the goal is to provide the lowest possible cost on the base engine. This lowest cost is the price that the customer has to pay when no extra options are required, such as paper handling accessories. To accomplish this, the additional functions typically provided other than straight image formation, are placed in a paper handling accessory and not in the base engine. The low cost base engine-only printer will always send the paper to a default destination and is not upgradeable to accept an accessory such as a stapler, collator, or binder, so no means for redirecting the media along a different path is provided or even necessary. Other printers, which are not base engine-only printers, typically include a diverter within the base engine so the printer can accept a paper handling accessory upgrade to direct the media to the paper handling accessory. This diverter adds an extra expense to the base engine model that the consumer should not have to incur if the consumer never desires to upgrade the printer to include other paper handling accessories. The expense covers the diverter, the solenoid to control the diverter, the space required for the diverter and solenoid, extra connectors for the solenoid and programming steps to control the solenoid and diverter.

Some consumers, however, wish to add additional features to the printer on top of the base model. If the base model lacks a diverter, then conventional paper handling accessories are unsuitable for operation with the base model unit.

Accordingly, what is needed is an image forming system that achieves the lowest possible base engine model, but yet can be upgraded to provide accessories operable by the base engine model.

SUMMARY OF THE INVENTION

According to the present invention, an upgradeable image forming apparatus for printing on at least one page of a print media is disclosed. The apparatus includes a removable media handling device that directs the printed media to a first location or a second location, the second location functions as a finishing stage to perform a finishing step on the print media. The removable media handling device includes a media diverter to direct the media to either the first or second location. The image forming apparatus also includes a housing, a print engine to fix an image representing data to the page of print media, a formatter to supply data to the print engine, the formatter being configured to supply a first set of data representing the side of the page to be printed and a second set of data to provide instructions on the output of the printed page, and print media supply means for supplying pages of print media to the print engine from a stack of print media pages having leading edges.

DETAILED DESCRIPTION

The present invention is directed towards an image forming device that is produced with the lowest base engine possible for providing the consumer with the most cost effective printer device possible. The image forming device also includes the ability to accept various accessories in such a way as to continue to provide the lowest base price in the base unit while shifting the extra expense into the accessories for the consumer to purchase for the desired functionality. Additionally, the accessory typically includes a media diverter means to divert the media from the original finish destination to the accessory for further finishing provided by the accessory.

Figure 1:
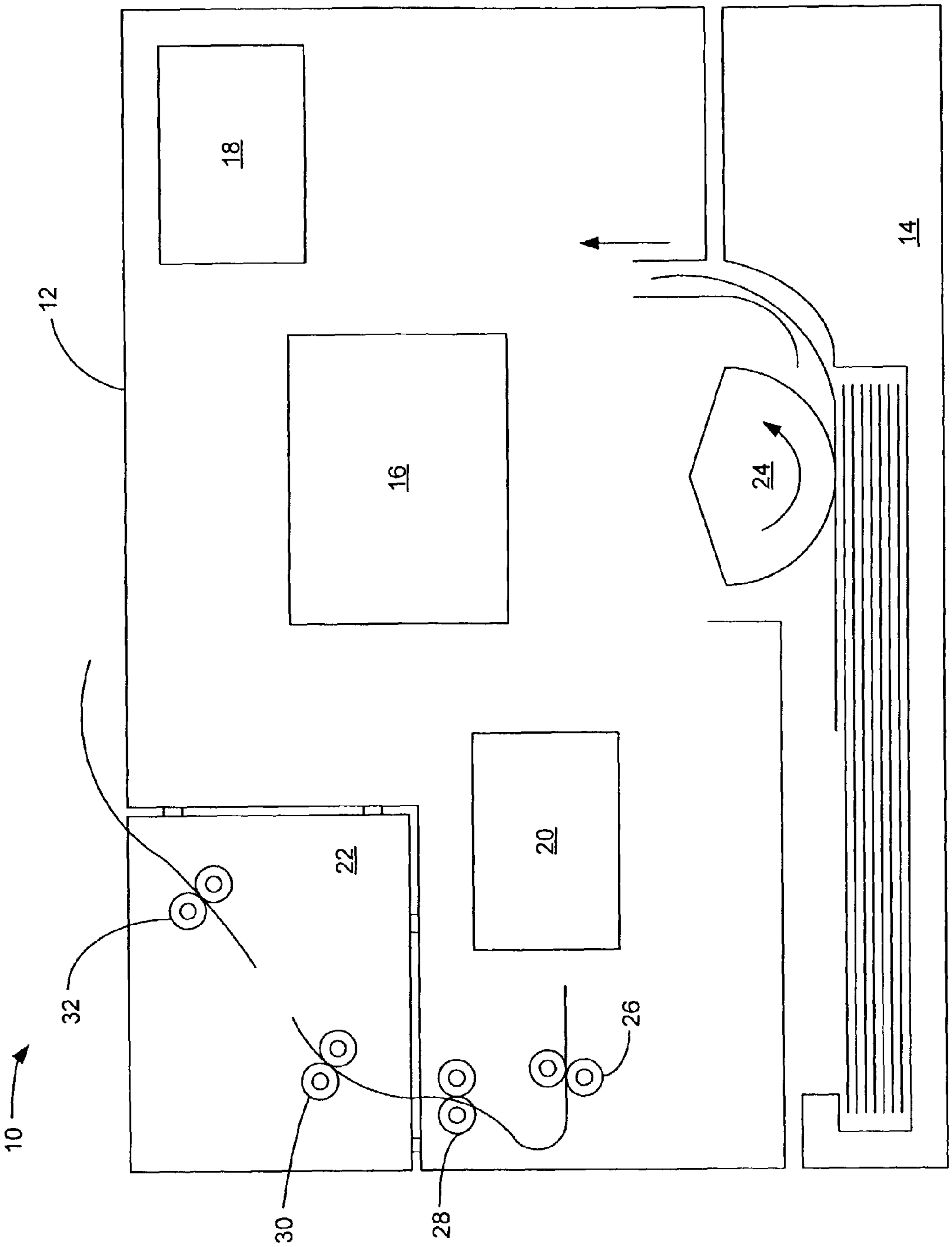
FIG. 1 illustrates a schematic diagram of an embodiment of the present invention.

FIG. 1 illustrates an image forming device 10, such as a standard laser printer. Other types of printers can include ink jet, multipurpose printers having print, copy, scan, or fax capabilities, or any combination thereof, and impact printers. In each model, it is desired that the paper handling capabilities be minimized in the base unit to control cost. Image forming device 10 includes a housing 12 containing a print engine 16, a formatter 18, and a print fuser 20. Formatter 18 controls printer engine 16 and supplies the engine with data to be printed. Image forming device 10 further includes an interchangeable standard handling unit 22, which provides a paper path from the fuser 20 to the output bin generally located on top of the printer housing 12. The output bin can be located to the side or even below the printer housing 12 in alternative applications.

A pickup roller 24 operates with the paper tray 14 to supply print media to the print engine 16 for printing. Pickup roller 24 defines the beginning of the overall paper path. Paper drive rollers 26 receive the media from fuser 20 and direct it to a second pair of paper drive rollers 28. Paper drive rollers 28 deliver the media to receiving rollers 30 found within handling unit 22. Receiving drive rollers 30 then deliver the media to output rollers 32, which then directs the media to the catch bin located on top of the printer housing 12.

Figure 2:
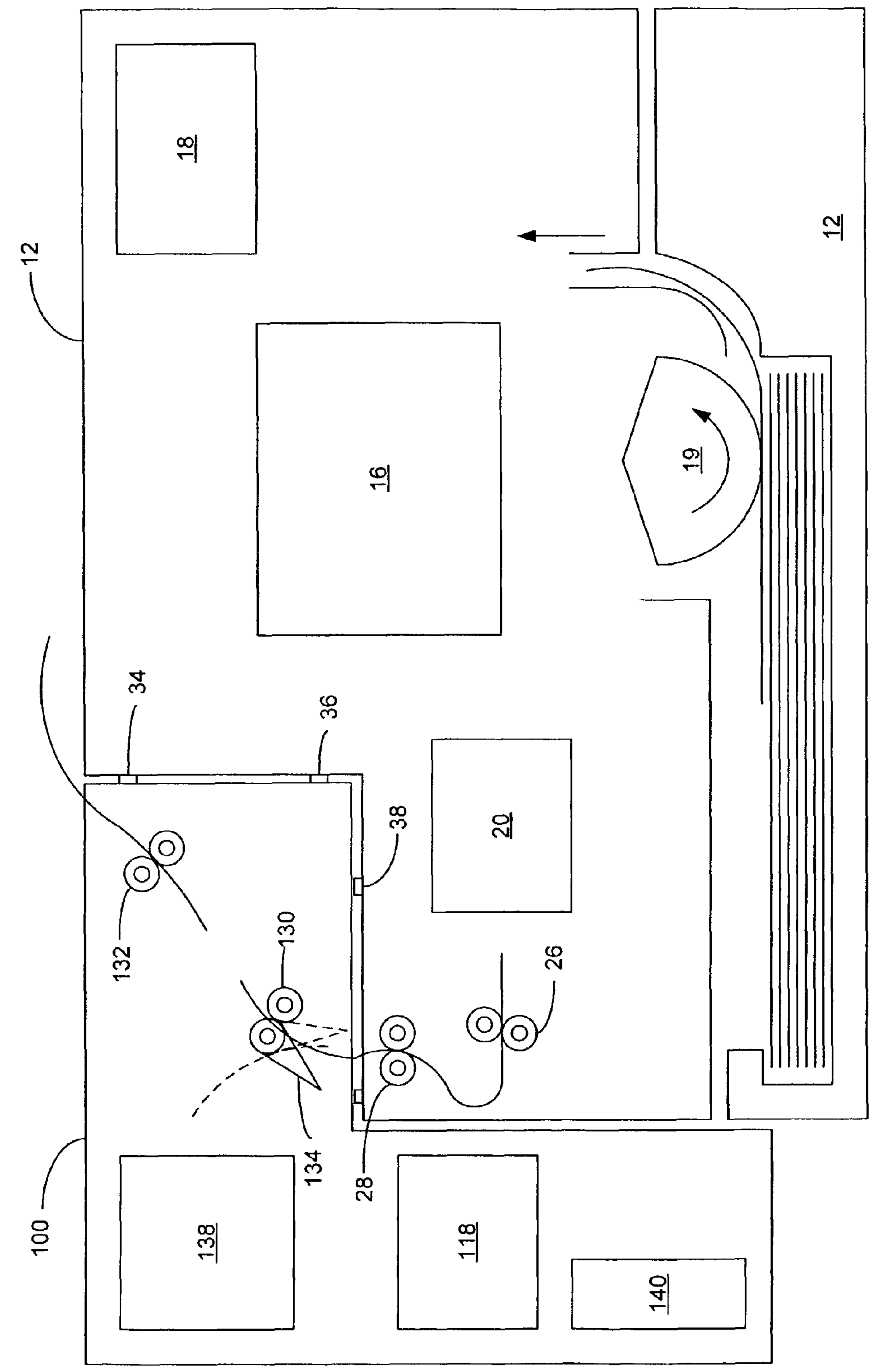
FIG. 2 illustrates a schematic diagram of an alternative embodiment of the present invention.

Printer housing 12 further includes connectors 34, 36, and 38, as shown in FIG. 2. Connector 34 provides physical contact of the handling unit 22 with the overall print system and functions also as a physical lock where necessary so that the handling unit 22 does not disengage from housing 12. Connector 36 provides electrical power to the rollers within handling unit 22 as well as provides power to any accessory unit that replaces handling unit 22 as will be described below. Further, connector 38 provides a controller connection such that information from formatter 18 may be communicated to handling unit 22 or any accessory unit replaced therefore so that the handling unit will operate synchronously with the base unit. Further, the formatter 18 can direct commands to the accessory unit to perform the supplemental finishing function provided by the accessory. It should be understood that the handling unit 22 will have similar connectors 34 for interacting with the base unit. Further, the handling unit 22 will have the appropriate electrical power connectors 36 to match up with those found on the base unit as well as the proper controller connector 38.

During operation, pickup roller 24 feeds the sheet into print engine 16 where imaging material is placed on the media in a form representing data to be printed as delivered by formatter 18. The media proceeds next to fuser 20 to fuse the imaging material to the media. The media exits fuser 20 and is directed up and out of the image forming device 10 by drive rollers 26, 28, 30, and 32 found within the base unit and in the handling unit 22. In this mode, image forming device 10 is not capable of doing anything other than printing the media with handling unit 22 in place. Accordingly, handling unit 22 is replaceable with an accessory unit 100 as shown in FIG. 2.

Accessory unit 100 has a housing in which receiving rollers 130 and output rollers 132 are positioned. Receiving rollers 130 include a path diverter 134, typically operated by a solenoid controlled by a separate accessory controller 118. Path diverter 134 directs the media to a finishing stage 138 placed within accessory unit 100 to perform the finishing function available within the accessory. Such functions may include stapling a plurality of sheets in a common stack, punching holes along a first edge or a second edge or both, performing a binding operation along a common spine of the stack of media sheets, or other useful and alternative finishing functions desired by the user. Accessory unit 100 also includes similar a physical connector 34, power connector 36, and controller connector 38 to provide power to accessory unit 100 as well as control commands from formatter 18 to separate controller 118 found within accessory unit 100. The operation of path diverter 134 is shown first in a solid line illustration, which shows how diverter 134 directs the media to the output bin on top of housing 12, and is also shown in ghosted form, which shows how diverter 134 directs the media to the finishing stage 138 within accessory unit 100.

Placing the diverter in the accessory unit in order to divert the media to the accessory unit simplifies the manufacturing of the base unit as well as reduces the cost for the consumer. The cost of the additional functionality desired by the consumer is passed on in the accessory unit purchased by the consumer who actually needs and wants the additional functionality provided by accessory unit 100.

Accessory unit 100 is interchangeable with the original handling unit 22 such that when the functionality offered by accessory unit 100 is no longer desired, and a smaller footprint for the image formatting device 10 is desired, the handling unit 22 replaces the accessory unit 100 as shown in FIG. 1.

While all of the rollers in this description can be single rollers spread across the width of the page, it should be apparent to those skilled in the art that multiple concentric rollers can and are used across the width of the page. Additionally, other drive configurations are possible and other sensing and control methods can be implemented within the scope of this invention.

Further, accessory unit 100 may also include its own output bin 140 such that the finished product may be delivered to the output bin 140 rather than delivered to the output bin on top of housing 12. Accordingly, the necessary media handling engines are also found within accessory unit 100 to provide the output operation of the media as well as to perform the finishing function defined within the accessory unit.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. An image forming apparatus for printing on print media, the apparatus comprising:

a housing;

a print engine, located within the housing, to fix an image to the print media;

a formatter to supply data to the print engine, the formatter configured to supply a first set of data representing an image to be printed on the print media and a second set of data providing instructions for output of printed media;

a print media supplier to supply the print media to the print engine;

a first media handling unit that receives the printed media from the print engine and includes a single media path that directs the printed media to a first output bin; and a second media handling unit, interchangeable with the first media handling unit, that receives the printed media from the print engine and includes a media diverter that directs the printed media to one of a first destination and a second destination as instructed by the formatter.

2. The apparatus according to claim 1 wherein the first destination is the first output bin and the second destination is a finishing stage for additional finishing.

3. The apparatus according to claim 1 wherein the second media handling unit further comprises:

an accessory controller to control operation of the second media handling unit and the media diverter; and a second output bin to receive the printed media after passing the second destination.

4. The apparatus according to claim 2 wherein the finishing stage is located within the second media handling unit.

5. The apparatus according to claim 2 wherein the finishing stage staples the printed media.

6. The apparatus according to claim 2 wherein the finishing stage punches holes in the printed media.

7. The apparatus according to claim 2 wherein the finishing stage binds the printed media along an edge of the printed media.

8. An image forming apparatus for printing on print media, the apparatus comprising:

a housing;

a print engine, located within the housing, to fix an image to the print media;

a formatter to supply data to the print engine, the formatter configured to supply a first set of data representing an image to be printed on the print media and a second set of data providing instructions for output of printed media;

a print media supplier that supplies the print media to the print engine;

a first media handling unit that receives the printed media from the print engine and includes a single media path that directs the printed media to a first output bin; and a second media handling unit, interchangeable with the first media handling unit, that receives the printed media from the print engine and includes multiple media paths that direct the printed media to a plurality of destinations.

9. The apparatus according to claim 8 wherein the second media handling unit comprises:

an accessory controller to control operation of the second media handling unit;

a media path diverter to divert the printed media to a finishing stage within the second media handling unit; and a second output bin to receive the printed media after finishing performed by the finishing stage.

10. The apparatus according to claim 9 wherein the finishing stage staples the printed media.

11. The apparatus according to claim 9 wherein the finishing stage punches holes in the printed media.

12. The apparatus according to claim 9 wherein the finishing stage binds the printed media along an edge of the printed media.

13. An image forming apparatus for printing on print media, the apparatus comprising:

a housing;

a print engine, located within the housing, to fix an image to the print media;

a formatter to supply data to the print engine, the formatter configured to supply a first set of data representing an image to be printed on the print media and a second set of data providing instructions for output of printed media; and a print media supplier to supply the print media to the print engine, said image forming apparatus configured to interchangeably receive a first media handling unit that receives the printed media from the print engine and includes a single media path that delivers the printed media to a destination, and a second media handling unit that receives the printed media from the print engine and includes a media diverter that directs the printed media to one of a plurality of destinations.

14. The apparatus according to claim 13 wherein the plurality of destinations include an output bin for receiving the printed media and a finishing stage for additional finishing.

15. The apparatus according to claim 13 wherein the second media handling unit further comprises:

an accessory controller to control operation of the second media handling unit and the media diverter;

a finishing stage to perform additional finishing on the printed media; and an output bin to receive the printed media after finishing performed by the finishing stage.

16. The apparatus according to claim 14 wherein the finishing stage is located within the second media handling unit.

17. The apparatus according to claim 1 wherein the image forming apparatus comprises a base engine-only printer including the housing, the print engine, the formatter, and the print media supplier, and wherein the first media handling unit and the second media handling unit are interchangeably accepted by the base engine-only printer.

18. The apparatus according to claim 8 wherein the image forming apparatus comprises a base engine-only printer including the housing, the print engine, the formatter, and the print media supplier, and wherein the first media handling unit and the second media handling unit are interchangeably accepted by the base engine-only printer.

19. The apparatus according to claim 13 wherein the image forming apparatus comprises a base engine-only printer including the housing, the print engine, the formatter, and the print media supplier, and wherein the base engine-only printer interchangeably receives the first media handling unit and the second media handling unit.

* * * * *